United States Patent [19]

Castel

[11] Patent Number: 5,106,269
[45] Date of Patent: Apr. 21, 1992

[54] METHOD AND DEVICE FOR PUMPING A PETROLEUM FLUID

[75] Inventor: Yvon Castel, Croissy sur Seine, France

[73] Assignee: Institut Francais du Petrole, Rueil-Malmaison, France

[21] Appl. No.: 440,874

[22] Filed: Nov. 24, 1989

[30] Foreign Application Priority Data

Nov. 23, 1988 [FR] France .................. 88 15237

[51] Int. Cl.⁵ .................. F04B 41/06; G01G 11/04
[52] U.S. Cl. .................. 417/63; 137/88; 73/434; 417/4
[58] Field of Search .......... 417/63, 87, 3, 4, 5; 73/434, 433; 137/88

[56] References Cited

U.S. PATENT DOCUMENTS

| | | | |
|---|---|---|---|
| 1,446,903 | 2/1923 | Jennings | 417/3 |
| 4,285,239 | 8/1981 | Heine | 73/434 |
| 4,641,679 | 7/1991 | Arnaudeau | 137/88 |

FOREIGN PATENT DOCUMENTS 2534644 10/1982 France .

*Primary Examiner*—Richard A. Bertsch
*Assistant Examiner*—Peter Korytnyk
*Attorney, Agent, or Firm*—Antonelli, Terry, Stout & Kraus

[57] ABSTRACT

A method and device for pumping a petroleum fluid passing through a pipe and having a quantity of gas and a quantity of liquid. The quantities of gas and liquid are measured to determine the weight of the fluid in a section of the pipe and, depending upon the relative quantities of the gas and liquid measured, an additional quantity of gas or liquid is added prior to the fluid containing the additional quantity being pumped. After the fluid has been pumped, the quantity of gas or liquid serving as the additional added quantity is sampled.

11 Claims, 4 Drawing Sheets

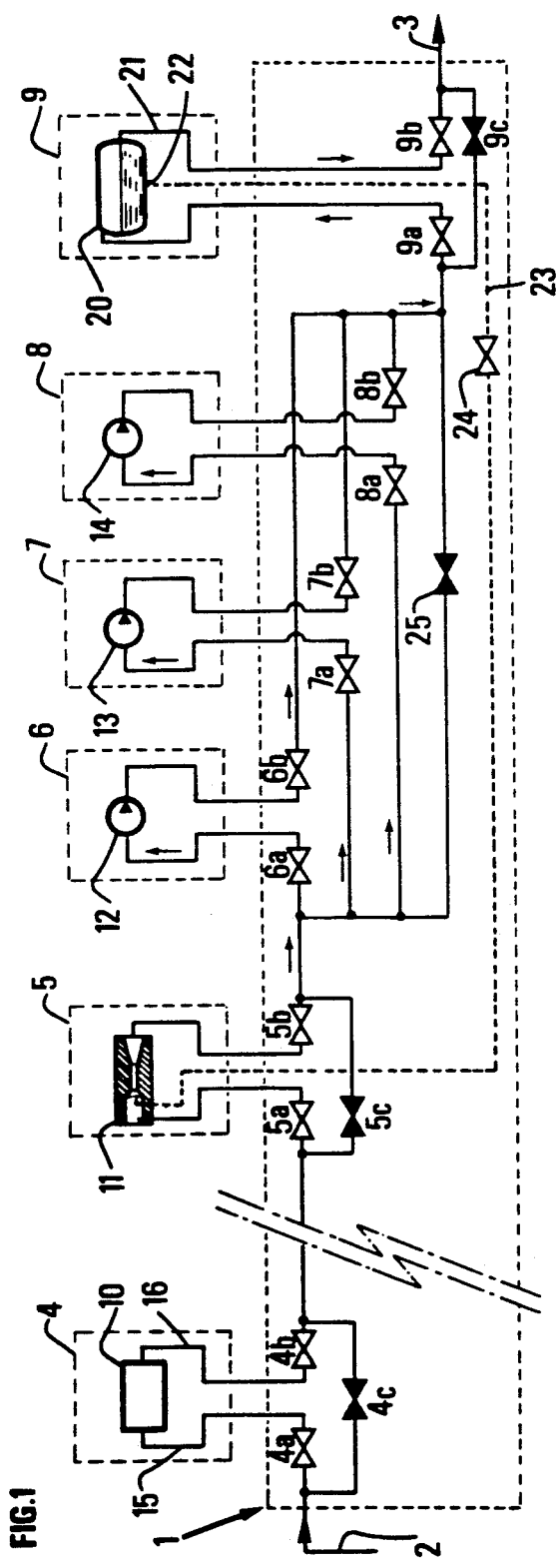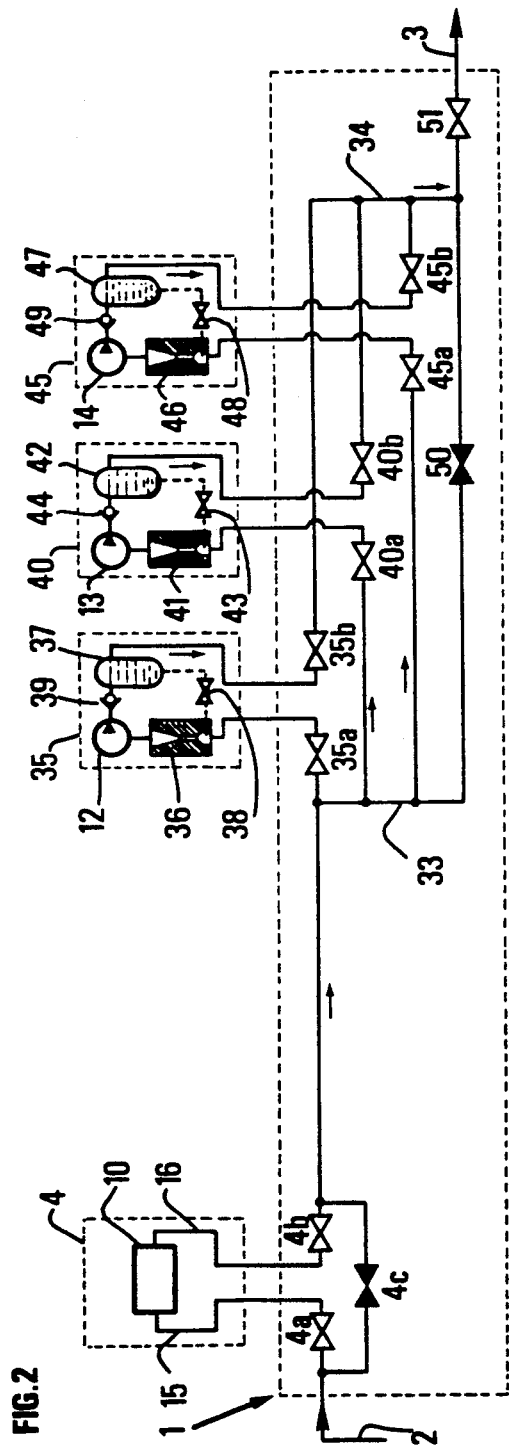

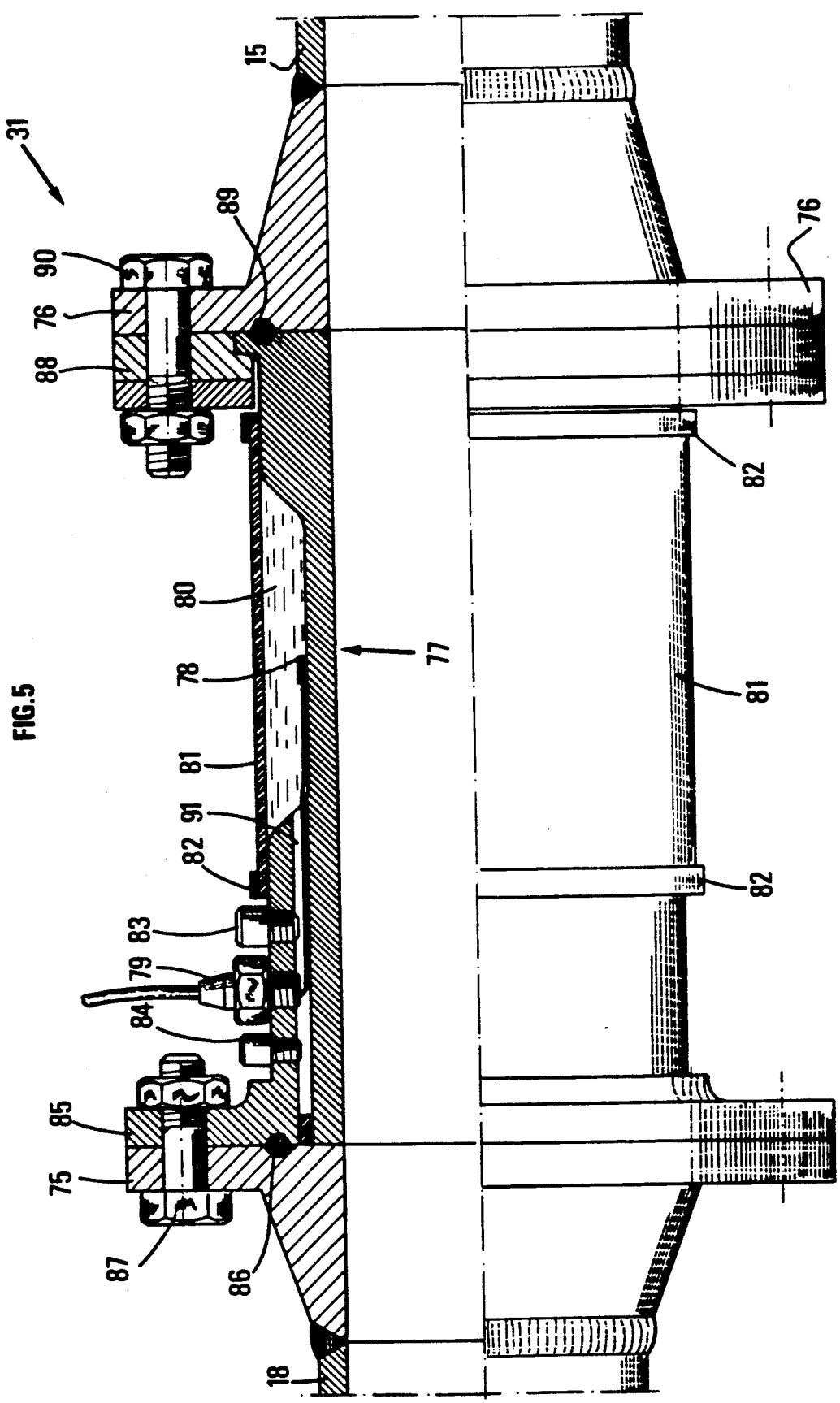

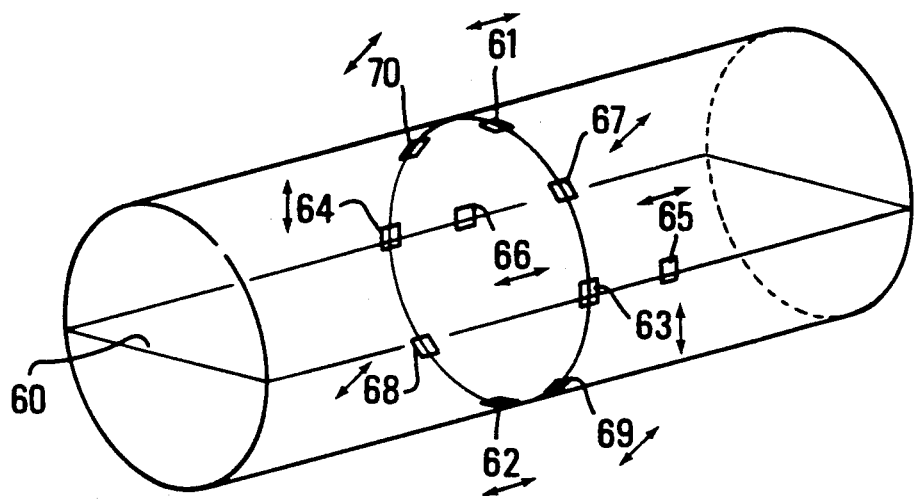

METHOD AND DEVICE FOR PUMPING A PETROLEUM FLUID

FIELD OF INVENTION

The invention relates to a device and a method for pumping a fluid passing through a pipe, and having a quantity of gas and a quantity of liquid.

The invention is particularly suitable for production of hydrocarbons comprising a gas-liquid mixture, which production may, in particular, but not exclusively, be carried out in an environment where access is difficult such as, for example, at a wellhead or an underwater transfer pipe, or in virgin forest. In general, the fluid of an oil deposit includes gas, petroleum, water, and solid particles such as sand.

The invention also applies to the chemical and oil industries or in general to all industries employing multiphase fluids.

The invention is also applicable to transfer of fluid by a centrifugal, axial-flow, or screw pump, or in general to dynamic pumping means requiring, for operation, a minimum quantity of liquid to prevent the pumping means from unpriming and will not be a departure from the scope of the invention if the pumping means require, for operation, a maximum quantity of liquid or minimum quantity of gas) as may be the case when gas is being transported or compressed with certain compressors.

BACKGROUND OF THE INVENTION

The use of an axial-flow pump to transfer fluids comprising liquid and gas is known; however, for flexible operation, these pumps require the proportions of liquid and gas not to change suddenly, particularly when plugs of gas or liquid occur.

SUMMARY OF THE INVENTION

The invention overcomes this drawback to the known arrangement by proposing a device capable of injecting a continuously variable quantity of gas or liquid as required.

The present invention proposes a device and method for pumping a fluid passing through a pipe and containing a quantity of gas and a quantity of liquid, with the device including means for measuring quantities of gas and liquid, means for regulating these quantities, means for controlling the regulating means as a function of the measurements supplied by the measuring means, and means for pumping the fluid located downstream of the regulating means.

The measuring means may include a pipe section in which the fluid flows, and which contains an element designed to measure the weight of fluid in the pipe section, with the pipe having a first part located downstream of the pipe section and a second part located upstream of the pipe section.

The measuring element may include a first connecting element disposed between the second part of the pipe and a first end of the pipe section, and a second connecting element disposed between the first part of the pipe section and a second end of the pipe section. The first element may have a first calibrated zone and the second element may have a second calibrated zone, and at least one of the first and second elements may have a sensor designed to measure strains or stresses in at least one of the first and second calibrated zones of the connecting elements when the quantities of gas and liquid vary in the pipe section.

The sensor may have at least one electrical strain gauge a may be designed to measure a twisting of at least one of the first and second connecting element. The sensor may be also be constructed to measure flexion of at least one of the first and second connecting elements.

The regulating means may be designed to inject an additional quantity of at least one of gas and liquid into the fluid.

At least one of the first and second connecting elements may comprise two flanges respectively designed to cooperate with flanges attached to the first and the second ends of the pipe section, and to one end of the first part or one end of the second part of the pipe section. The calibrated zone may be disposed between the two flanges, with the sensor being disposed in the calibrated zone and immersed in a protective liquid contained in a flexible membrane.

The pipe section may be of a loop shape.

The pumping means may comprise a dynamic pump such as an axial-flow pump, a screw pump, or a centrifugal pump. The device may include means for sampling liquid or gas which are located downstream of said pumping means and designed to supply said regulating means.

In accordance with the method of the present invention, quantities of gas and liquid are measured, an additional quantity of gas or liquid is added as a function of the relative quantities of gas and liquid before the fluid containing the additional quantity is pumped, and, after the fluid has been pumped, a quantity of gas or liquid serving as an additional quantity may be sampled.

The quantities of gas and liquid may be measured within the fluid by measuring the weight of fluid in a portion of the pipe section.

Since the pipe section is in the shape of a loop, to measure the weight of fluid, the strains or stresses representing the weight of fluid in the loop can be measured.

The strains or stresses may be measured in a calibrated zone of at least one of a first and second connecting elements, which are disposed respectively between at least one of a first and a second end of the loop, and a first end of the first part and a second end of the second part of the pipe section.

BRIEF DESCRIPTION OF THE DRAWING

The invention will be properly understood and its advantages will emerge clearly from the following description when taken in connection with the accompanying drawings which show, for the purpose of illustration only, several embodiments in accordance with the present invention, and wherein:

FIG. 1 shows schematically a general modular configuration of the device according to the invention applied to underwater production of effluents, FIG. 2 is a schematic diagram of an embodiment of the device according to the invention comprising several pumps, FIG. 5 represents in detail a connecting element comprising an element for measuring the weight of fluid according to the invention, and FIG. 6 indicates the possible positions of electrical strain gauges in a connecting element.

DETAILED DESCRIPTION

Figure 3:
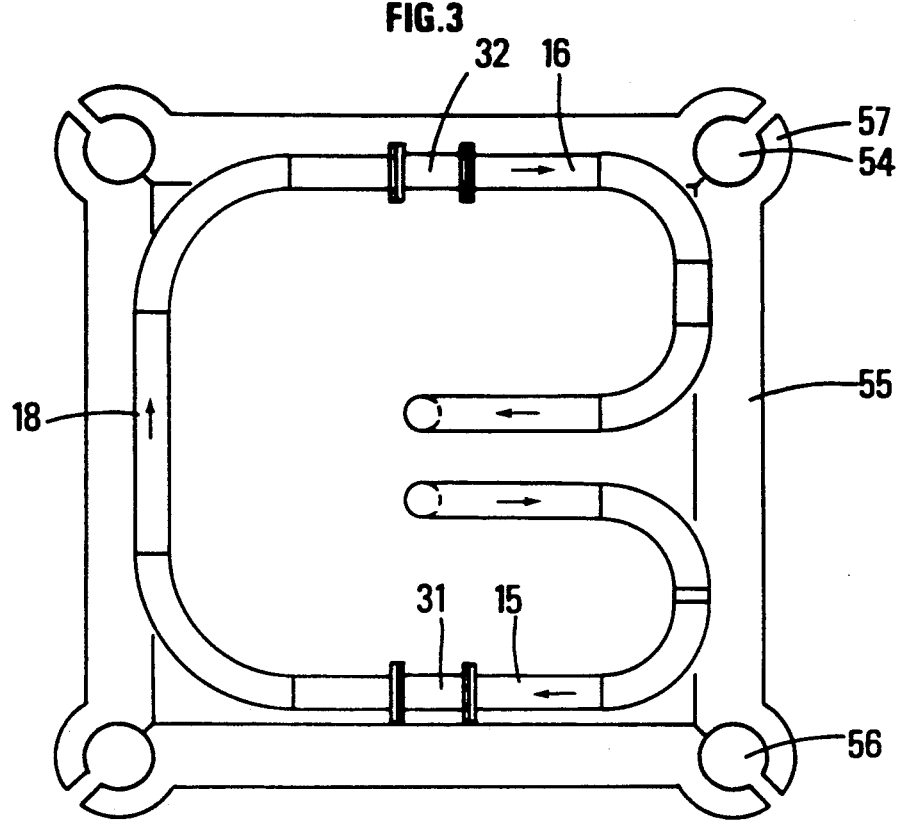
FIG. 3 is a top view of a module having measuring means according to the invention equipped with a U-shaped loop.

Referring now to the drawings wherein like reference numerals are used throughout the various views to designate like parts and, more particularly, to FIG. 1, according to this figure, the petroleum effluents are brought to a base generally designated by the reference numeral 1 by a supply pipe 2 and leave the base 1 via discharge pipe 3. Base 1 has lines for collecting and distributing effluents to a measuring module 4, regulating module 5, pumping modules 6–8 and outlet module 9 which can be raised independently of each other. Module 4 includes measuring or analysis means 10 for measuring quantities of liquid and gas in the effluent and is connected upstream of supply pipe 2. Module 5 includes regulatory means 11 for regulating quantities of liquid and gas, including a mixer located downstream of measuring means 10 being fed by the effluent and by liquid sampled downstream of pumping modules 6, 7, 8.

The effluent circulates in the mixer in an annular space before being supplemented, by a central jet, with additional liquid with which it mixes essentially at a neck and in a diverging conical diffuser. Such a mixer of liquid and gas is described for example, in French Patent No. 2,534,644. The regulating means are controlled on the basis of information supplied by measurements of the quantities of effluent liquid and gas provided by the measuring means 10.

The supplemented effluent is taken to pumping means 12, 13, 14 arranged in parallel. At the outlet from these pumping means, the effluent is sent to a reservoir 20 of the outlet module 9 for decanting and sampling a part of the effluent liquid, by an overflow 21 near the top of the reservoir 20, with the overflow 21 supplying the discharge pipe 3. Reservoir 20 has a low liquid tapping point 22 connected by a pipe 23 to a supplementary liquid feed to the mixer of regulating means 11. Each of modules 4, 5, 6, 7, 8, 9 can be respectively isolated from the base 1 pairs of valves 4a–4b, 5a–5b, 6a–6b, 7a–7b, 8a–8b, 9a–9b and bypassed by valves 4c, 5c, 9c, and, possibly valve 25, if pumping modules 6, 7, 8 are simultaneously isolated, with valve 25 allowing all the pumping modules 6, 7, and 8 to be bypassed.

Valve 24 also enables the supplementary liquid feed to the mixer coming from low tapping point 22 of decanting reservoir 20 to be cut off.

The arrows shown along the lines shown schematically in FIG. 1 indicate the directions taken by the various fluids flowing through these pipes.

Measuring means 10 are connected to base 1 by a supply pipe 15 and a return pipe 16.

The length of piping between the measuring means 10 and regulating means 11 is adapted to the response time of the regulating means 11 and the speed of the effluents in the various pipes so as to prevent gas plugs from penetrating to pumping means 12, 13, 14.

Conventionally, the valves drawn in black are closed and those drawn in white are open.

In FIG. 2, to improve reliability, a base 1' is provided having a limited number of raisable modules including the measuring module 4 having the measuring means 10 which can be isolated by the pair of valves 4a and 4b or bypassed by opening the valve 4c. The measuring means 10 are supplied with fluid via supply pipe 2 as in the embodiment of FIG. 1.

In the embodiment of FIG. 2, the fluid passes through the measuring means 10 and arrives at an inlet manifold 33 supplying three independent pumping modules 35, 40, 45. The fluid which has passes through the pumping modules 35, 40, 45 is collected in an outlet manifold 34 which connects to discharge pipe 3 through a shutoff valve 51.

Inlet manifold 33 and manifold 34 are connected together by a bypass line for the pumping modules 35, 40, 45 with a valve 50.

Each of the independent pumping modules 35, 40, and 45 has a regulating means or mixer 36, 41, and 46 respectively, supplied chiefly by inlet manifold 33 respectively connected to the pumping means 12, 13, and 14. Each of the outlets of the pumping modules 35, 40, 45 is respectively connected through a check valve 39, 44, and 49 to a respective decanting reservoir 37, 42, 47 which has an overflow connected to the manifold 34. Decanting reservoirs 37, 42, 47 collect the additional fluid that supplies mixers 36, 37, 38 respectively via pipes 38, 43, 48, each provided with a shutoff valve.

According to the advantageous embodiment of FIG. 2, the information on the quantities of liquid and gas furnished by the measuring or analysis means 10 is processed by the regulating means 36, 41, 46 which, for each of pumping modules 35, 40, 45, controls supplementary injection of liquid into each of the respective regulating means or mixers 36, 41, 46. The distance between the analysis or measuring module 4 and the pumping modules 35, 40, 45 is adapted to the speed of the effluents in the various pipes and the response time of the regulating means.

As shown in FIG. 3, the measuring module 4 having the measuring means 10 for measuring the quantities of liquid and gas entering base 1 via pipe 2 includes a square frame 55 having guide sleeves 56 respectively disposed at the four corners, with each of the guide sleeves 56 with centering cones at a lower portion thereof. These sleeves 56 and cones 57 allow the frame 55 to be lowered along guidelines to guide posts disposed on base 1 as is currently done when lowering underwater modules onto underwater bases. When module 4 has settled on base 1, the connection is made between the two parts of supply pipe 15 and the two parts of return pipe 16, with these pipe parts being integral with frame 55 of the module or base 1.

The supply pipe is connected by a first connecting element 31 to the first end of a pipe section 18 and the second end of pipe section 18 is connected by a second connecting element 32 to return pipe 16. The section of pipe 18 makes a loop which is attached only to connecting elements 31 and 32 and which has an overhang. The intensity of the forces due to this overhang varies when the liquid and gas composition of the fluid changes, thus producing, in connecting elements 31 and 32, stresses and strains which are a function of the composition of the weight of fluid in the pipe.

The loop shown is U-shaped and the strains measured in connecting elements 31 and 32 are flexural strains.

Figure 4:
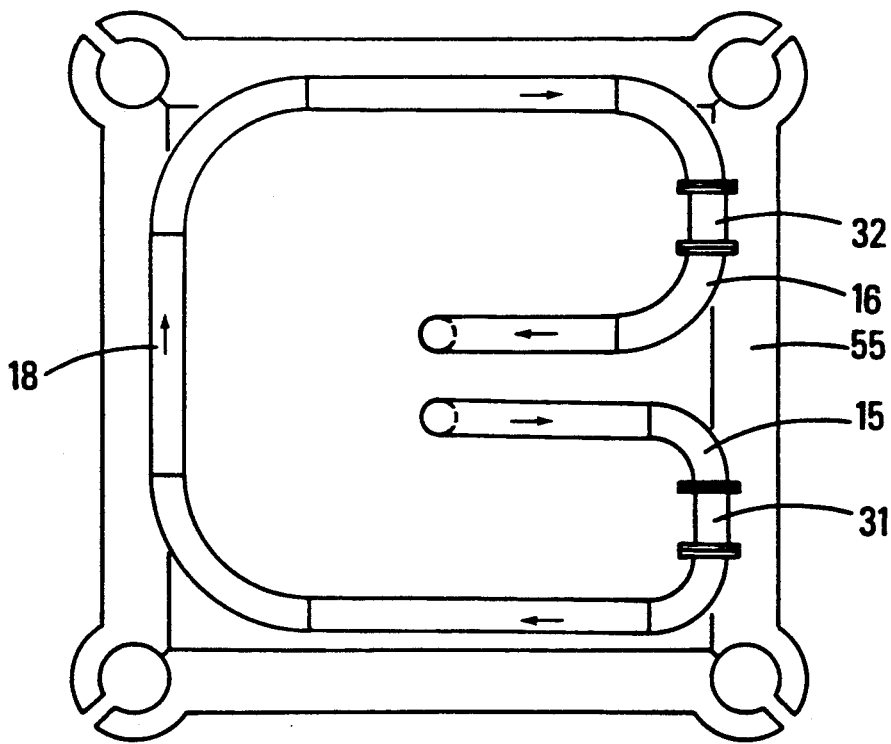
FIG. 4 is a top view of an embodiment of a module comprising measuring means according to the invention equipped with an omega-shaped loop.

FIG. 4 shows an embodiment of the module having measuring means using an omega-shaped loop.

According to the embodiment of FIG. 4, twisting strains are measured in connecting elements 31 and 32, having a known stiffnesses, between the supply pipe 15 and the return pipe 16 and loop 18. These strains are due to the weight of the empty loop with an overhang with respect to these connecting elements 31 and 32 and the weight of fluid present in loop 18 between the two connecting elements. Strain sensors located in the connecting elements are designed to measure the differences in the weight of fluid in the loop as a function of time to determine the quantities of liquid and gas. This assumes that the weight of the gas is negligible by comparison with the weight of the liquid.

FIG. 5 shows in detail the connecting element 31 of the weighing or densitometric loop of the device according to the invention.

In FIG. 3, the U shape of loop 18 allows placement of the connecting element equipped with a flexion sensor at each end of the loop in order to measure the weight of the mass of fluid in the loop.

In FIG. 4, the omega shape ($\Omega$) of loop 18 allows a connecting element equipped with a twist sensor to be placed at each of its ends to measure the weight of the mass of fluid in the loop.

It is possible to use other densitometric loop shapes and measure the strains or stresses representative of the weight of the mass of fluid in the loop.

It is also possible to measure the strains of a loop whose ends would have been very rigidly embedded.

It is additionally possible to measure the weight of a loop whose ends were articulated with sufficient flexibility to detect the variations in weight linked to variations in the composition of the effluent.

Connecting elements 31 and 32 are disposed at the ends of loop 18 which is held solely by these two connecting elements 31, 32. Element 31 is connected to loop 18 and to pipe 15 by two API flanges 75 and 76 respectively, welded to loop 18 and pipe 15.

Element 31, like element 32, has in its central part a calibrated zone 77 in which are disposed extensometric gauges 78 placed, for example, at an angle of 45° to the axis of element 31 when the twisting of the element is to be measured. These gauges are supplemented by longitudinal gauges which measure the vertical flexion of, and pull on, the connecting element, and by transverse gauges which measure the pressure. Article R1820 by Jean Avril in "Techniques de l'Ingenieur," on extensometric sensors, describes the various measuring techniques using electrical extensometric gauges. The gauges are connected to a submersible electrical connector 79 such as a connector manufactured by Souriau et Compagnie, Jupiter, or Deutsch, attached to the wall of the connecting element, and which can be connected to the strain-measuring instruments.

Gauges 78 are protected from the outside environment by an insulating fluid 80 disposed inside a flexible membrane 81, sealed to sensor 31 by using two clamps 82 to mount it on a cylindrical support of element 21. Fluid 80 is introduced beneath membrane 81 by a filling valve 83 and a drain plug 84, which are attached to the wall of element 31 and connected by a channel 91 in the space delimited by calibrated zone 77 and flexible membrane 81.

Element 31 has on one side an API 85 flange cooperating with flange 75, a metal-to-metal joint 86 of the BX type, and bolts 87 to ensure immobilization and tightness with respect to measuring loop 18, and on the other side four half-washers mounted in a staggered arrangement to constitute a rotating flange 88, with the washers cooperating with a metal-to-metal joint 89 of the BX type and bolts 90 to ensure, without initial twisting, mounting and sealing of connecting element 31 on pipe 15.

FIG. 6 indicates the possible positions of the various electrical strain gauges on a connecting element as a function of the various types of strain to be measured.

Since plane 60 is a horizontal reference plane, longitudinal gauges 61 and 62 measure the vertical flexion strains, the flexural force being along a perpendicular to horizontal plane 60. Transverse gauges 63 and 64 measure the circumferential strains due to the effect of pressure on the calibrated zone. Longitudinal gauges 65 and 66 measure the longitudinal strains due in particular, to the bottom-hole pressure. Gauges 67, 68, 69, and 70, which are inclined at 45° to the axis of the connecting element and which are duplicated for redundancy, measure the twisting of the calibrated zone of the connecting element.

The direction in which each of gauges 61 to 70 measures the stresses and strains is indicated by a double arrow located near the numerical reference of each of these gauges.

Depending on the type of weighing loop, the sensor measures either flexion or twisting of the connecting element.

It will not be a departure from the scope of the invention to dispose the sensors in another fashion and/or to interpret other stresses and strains of the connecting element, since the stresses and strains are representative of the mass of fluid in the loop.

The information furnished by the sensors is sent to an instrument that determines the different stresses in the connecting elements, particularly stresses due to the weight of the mass of fluid in the loop. Then, based on this stress information, the instrument determines the weight of fluid in the loop, then the quantities of liquid and gas in the loop.

The information on the quantities of liquid and gas in the loop is sent to control means which, as a function of, for example, a preset program, and the information on the fluid in the loop, controls the regulating means to inject or not to inject, possibly in proportion to the difference between the value of the information and one or more fixed values, a quantity of liquid upstream of the pumping means.

It is possible to control the regulating means only when the quantity of gas (or liquid) has reached a given threshold for a given minimum time.

Dynamic analysis of the stresses or strains, and the patterns of vibrations brought about, for example, by a succession of gas pockets and liquid plugs, enables the pattern or the structure of the flow in the weighing loop and its development over time to be determined. The multiphase fluid may be composed, for example, of droplets of liquid in suspension in the gas, namely a mist, or of gas bubbles in the liquid, or of a liquid phase separate from a gas phase.

If one considers symmetrical distribution of the weight of fluid in the weighing loop, one may make the measurements with a single connecting element.

As a non-limiting example, a loop such as that illustrated in FIG. 3 was constructed, measuring 4.20 m in length, having an internal cross section of 280 cm$^2$, and having an interior volume of 117.6 dm$^3$.

Three seconds was considered as the response time of the measuring, control, and regulation system, and the gas was moved at a mean speed of 7 m/s, with a minimum of 21 meters of pipe being required between the module containing the measuring means and the pumping module or modules, to wet a gas pocket moving toward the pumping means and to avoid unpriming of the pumping module or modules.

I claim:

1. Device for pumping a fluid circulating in a pipe, the fluid including a quantity of gas and a quantity of liquid, the device comprising:

means for measuring said quantities of gas and liquid including a pipe section through which said fluid flows, means for measuring a weight of fluid in said pipe section, said pipe having a downstream part located downstream of said pipe section and having an upstream part located upstream of said pipe section, said means for measuring a weight including a first connecting element disposed between said part of said pipe upstream of said pipe section and a first end of the pipe section and a second connecting element disposed between said downstream part of the pipe and a second end of said pipe section, said first connecting element includes a first calibrated zone and said second connecting element includes a second calibrated zone, at least one of said first connecting element and said second connecting element has at least one sensor for measuring at least one of strains and stresses of at least one of the first calibrated zone and the second calibrated zone when the quantities of gas and liquid vary in said pipe section;

means for regulating said quantities of gas and liquid;

means for controlling said regulating means as a function of measurements by said measuring means; and means disposed downstream of said regulating means for pumping said fluid, wherein at least one of said first connecting element and said second connecting element has two flanges adapted to cooperate with flanges attached to one of said first end and said second end of the pipe section, and to one end of one of said part downstream and one end of said part upstream of the pipe section, and wherein said calibrated zone is disposed between said two flanges, said sensor is disposed in said calibrated zone and immersed in a protective liquid, said protective liquid being contained beneath a flexible membrane.

2. Device according to claim 1, wherein said sensor is adapted to measure a twisting of one of said first connecting element and said second connecting element.

3. Device according to claim 1, wherein said sensor is adapted to measure flexion of one of said first connecting element and said second connecting element.

4. Device according to claim 1, wherein said means for regulating are adapted to inject an additional quantity of at least one of a gas and liquid into said fluid.

5. Device according to claim 1, wherein said means for pumping is one of an axial-flow pump, a screw pump, and a centrifugal pump.

6. Method for pumping a petroleum fluid flowing in a pipe and including a quantity of gas and a quantity of liquid, the method comprising the steps of;

measuring the quantities of gas and liquid by determining a weight of fluid in a section of said pipe;

adding an additional quantity of gas or liquid as a function of the relative quantities of gas and liquid measured before the fluid containing the additional quantity is pumped;

sampling a quantity of gas or liquid serving as an additional quantity after the fluid has been pumped.

7. Method according to claim 6, wherein said section of pipe has a loop shape, and wherein the weight of the fluid is determined by measuring at least one of strains and stresses in said section of pipe.

8. Method according to claim 7, wherein the step of measuring at least one of said strains and stresses is carried out in a calibrated zone of one of the first and a second connecting element disposed respectively between one of a first and a second end of said section of pipe, and one of a first end of a downstream part of said pipe and a first end of an upstream part of said pipe.

9. Method according to claim 6, wherein the step of adding the additional quantity of gas or liquid is carried out only when the quantities of gas and liquid in the fluid have reached a given threshold for a given time period.

10. Device for pumping a fluid circulating in a pipe, the fluid including a quantity of gas and a quantity of liquid, the device comprising:

means for measuring said quantities of gas and liquid including a pipe section through which said fluid flows, means for measuring a weight of fluid in said pipe section, said pipe having a downstream part located downstream of said pipe section and having an upstream part located upstream of said pipe section, said pipe section being loop-shaped;

means for regulating said quantities of gas and liquid;

means for controlling said regulating means as a function of measurements by said measuring means; and means disposed downstream of said regulating means for pumping said fluid.

11. Device for pumping a fluid circulating in a pipe, the fluid including a quantity of gas and a quantity of liquid, the device comprising:

means for measuring said quantities of gas and liquid;

means for regulating said quantities of gas and liquid;

means for controlling said regulating means as a function of measurements by said measuring means;

means disposed downstream of said regulating means for pumping said fluid; and means for sampling one of a liquid and gas, disposed downstream of said means for pumping and being adapted to supply said means for regulating.

* * * * *